US009951668B2

(12) United States Patent
Ide et al.

(10) Patent No.: US 9,951,668 B2
(45) Date of Patent: Apr. 24, 2018

(54) CRANKCASE FILTER ASSEMBLY

(71) Applicant: RB Distribution, Inc., Colmar, PA (US)

(72) Inventors: Stephen R. Ide, Nazareth, PA (US); Kunjan S. Khambhati, King of Prussia, PA (US); James Laverty, Pennsburg, PA (US)

(73) Assignee: RB Distribution, Inc., Colmar, PA (US)

( * ) Notice: Subject to any disclaimer, the term of this patent is extended or adjusted under 35 U.S.C. 154(b) by 178 days.

(21) Appl. No.: 14/928,889

(22) Filed: Oct. 30, 2015

(65) Prior Publication Data
US 2017/0120183 A1 May 4, 2017

(51) Int. Cl.
*B01D 50/00* (2006.01)
*F01M 13/04* (2006.01)
*B01D 45/08* (2006.01)
*B01D 36/00* (2006.01)
*B29C 65/00* (2006.01)

(52) U.S. Cl.
CPC ........... *F01M 13/04* (2013.01); *B01D 36/001* (2013.01); *B01D 45/08* (2013.01); *B29C 65/00* (2013.01); *F01M 2013/0433* (2013.01); *F01M 2013/0438* (2013.01)

(58) Field of Classification Search
CPC ........... F01M 13/04; F01M 2013/0438; F01M 2013/0433; B01D 36/001; B01D 45/08
See application file for complete search history.

(56) References Cited

U.S. PATENT DOCUMENTS

| 2,866,519 | A | * | 12/1958 | Engman | B01D 45/08 55/485 |
| 4,012,209 | A | * | 3/1977 | McDowell | B01D 45/10 261/107 |
| 4,358,433 | A | * | 11/1982 | Pircon | B01D 45/08 261/116 |
| 4,744,958 | A | * | 5/1988 | Pircon | B01D 45/08 261/116 |
| 5,937,816 | A | * | 8/1999 | Wincewicz | F02M 19/00 123/195 A |
| 6,290,738 | B1 | | 9/2001 | Holm | |
| 6,354,283 | B1 | * | 3/2002 | Hawkins | F01M 13/04 123/572 |
| 6,478,019 | B2 | * | 11/2002 | Fedorowicz | F01M 13/0416 123/572 |
| 6,576,045 | B2 | * | 6/2003 | Liu | F01N 3/0215 55/323 |

(Continued)

OTHER PUBLICATIONS

KLM Performance—6.7L Cummins Replacement Crank Case Vent Filter CV52001; (http://www.klmperformance.com/); retrieved Oct. 30, 2015.

*Primary Examiner* — Dung H Bui
(74) *Attorney, Agent, or Firm* — Volpe and Koenig, P.C.

(57) ABSTRACT

A filter assembly that includes a separator for separating gas from a fluid. The assembly includes; a base with surrounding walls that define a fluid reservoir; a baffle that overlies at least a portion of the reservoir; a filter element that is beneath the baffle and in the reservoir; and, a cover that is removably fastened to the base and includes a fluid inlet that terminates in a conical base with an unrestricted opening and the baffle includes a fluid impact cone.

2 Claims, 7 Drawing Sheets

(56) References Cited

U.S. PATENT DOCUMENTS

| | | | | |
|---|---|---|---|---|
| 6,626,163 B1* | 9/2003 | Busen | ................... | B01D 45/12 |
| | | | | 123/572 |
| 7,080,636 B2* | 7/2006 | Knaus | ................. | F01M 13/022 |
| | | | | 123/572 |
| 7,186,282 B2* | 3/2007 | Su | .................... | B01D 46/0031 |
| | | | | 210/130 |
| 7,582,130 B2* | 9/2009 | Ng | ........................ | B01D 46/10 |
| | | | | 123/198 E |
| 7,604,676 B2* | 10/2009 | Braziunas | ............. | B01D 45/06 |
| | | | | 123/198 E |
| 7,648,543 B2* | 1/2010 | Faber | ................... | B01D 45/08 |
| | | | | 55/329 |
| 7,959,714 B2* | 6/2011 | Smith | ............... | B01D 46/0002 |
| | | | | 123/198 E |
| 8,105,412 B2* | 1/2012 | Severance | ........... | B01D 46/002 |
| | | | | 55/482 |
| 8,152,884 B1* | 4/2012 | Severance | ............. | B01D 45/08 |
| | | | | 55/462 |
| 8,252,079 B2* | 8/2012 | Gruhler | .................. | B29C 65/58 |
| | | | | 55/320 |
| D671,201 S* | 11/2012 | Yano | .......................... | D23/365 |
| 9,138,671 B2* | 9/2015 | Janakiraman | .......... | B01D 45/08 |
| 9,138,673 B2* | 9/2015 | Von Seggern | ..... | B01D 46/0031 |
| D769,328 S* | 10/2016 | Ide | ................................ | D15/5 |
| D769,329 S* | 10/2016 | Ide | ................................ | D15/5 |
| 2009/0193972 A1* | 8/2009 | Schwandt | .......... | B01D 19/0031 |
| | | | | 95/247 |
| 2011/0023429 A1* | 2/2011 | Janakiraman | ......... | B01D 45/08 |
| | | | | 55/434 |
| 2014/0259924 A1* | 9/2014 | Leininger | ............. | C10K 1/022 |
| | | | | 48/99 |

* cited by examiner

CRANKCASE FILTER ASSEMBLY

FIELD OF INVENTION

The invention relates to a crankcase filter assembly of the type that employees the filter structure to provide inert separation of gas and liquid components as they pass through the filter.

BACKGROUND

Inertial gas-liquid separators are known for use, particularly in diesel engines, in separating gas from liquid particles in a gas-liquid stream by accelerating the stream through holes or nozzles to achieve separation. In some prior art assemblies, a collection surface is used for impingement, which causes separation of the liquid particle from the gas-liquid stream. As a general matter, the prior art assemblies have been effective in performing the separation. However, the prior art assemblies are sealed units that are not serviceable and can be subject to premature replacement due to particle build up caused by the configuration of the separation tube.

There is a need for a serviceable assembly and an efficient and economical replaceable filter element.

SUMMARY

The present invention provides a serviceable filter assembly and replaceable filter element for the assembly.

BRIEF DESCRIPTION OF THE DRAWING(S)

The invention will be more fully understood with reference to the drawings wherein the same number is used to identify like elements.

Figure 1:
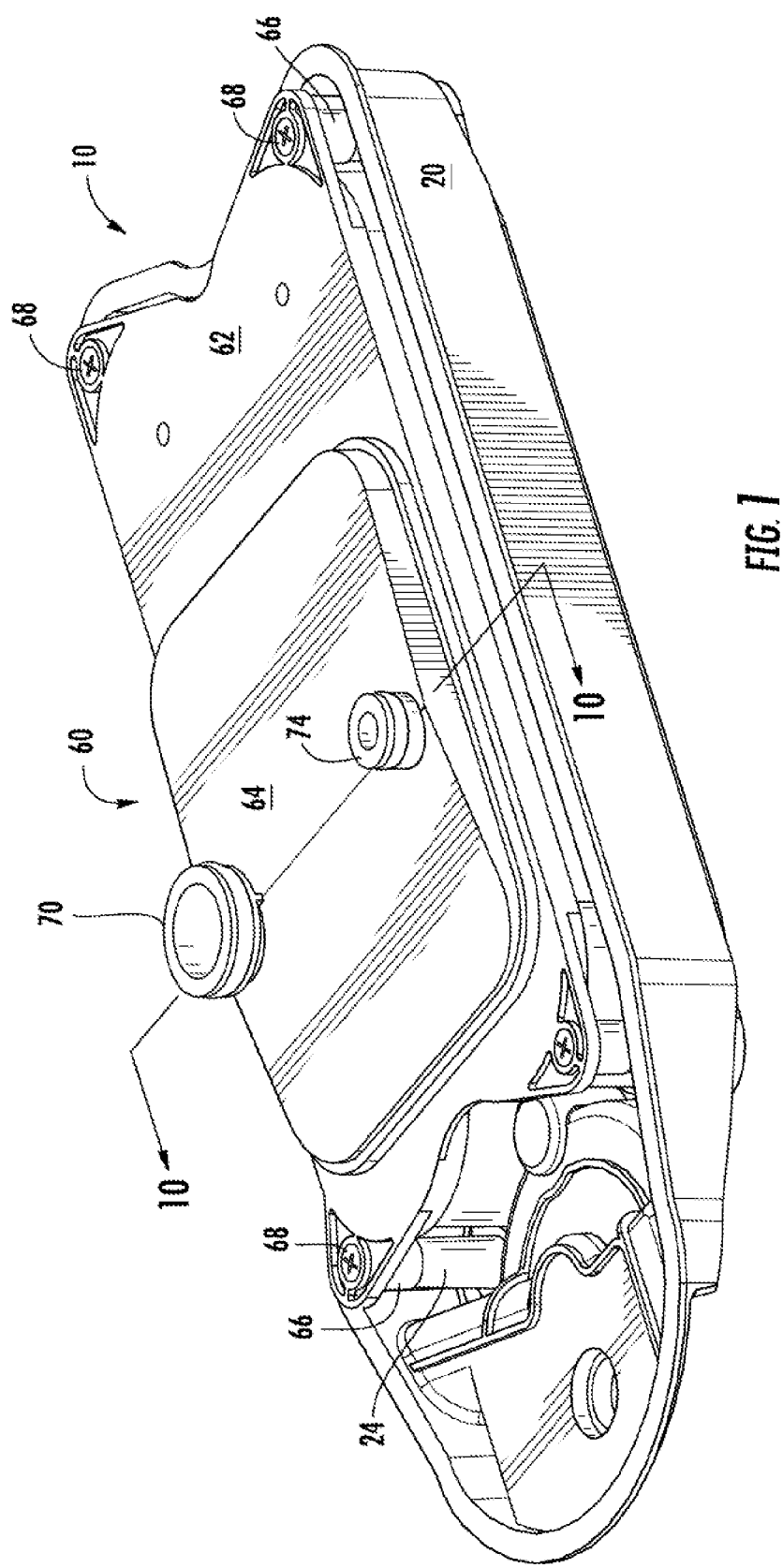
FIG. 1 illustrates a filter assembly with a removable cover that is configured to fit the prior art application.
Figure 4:
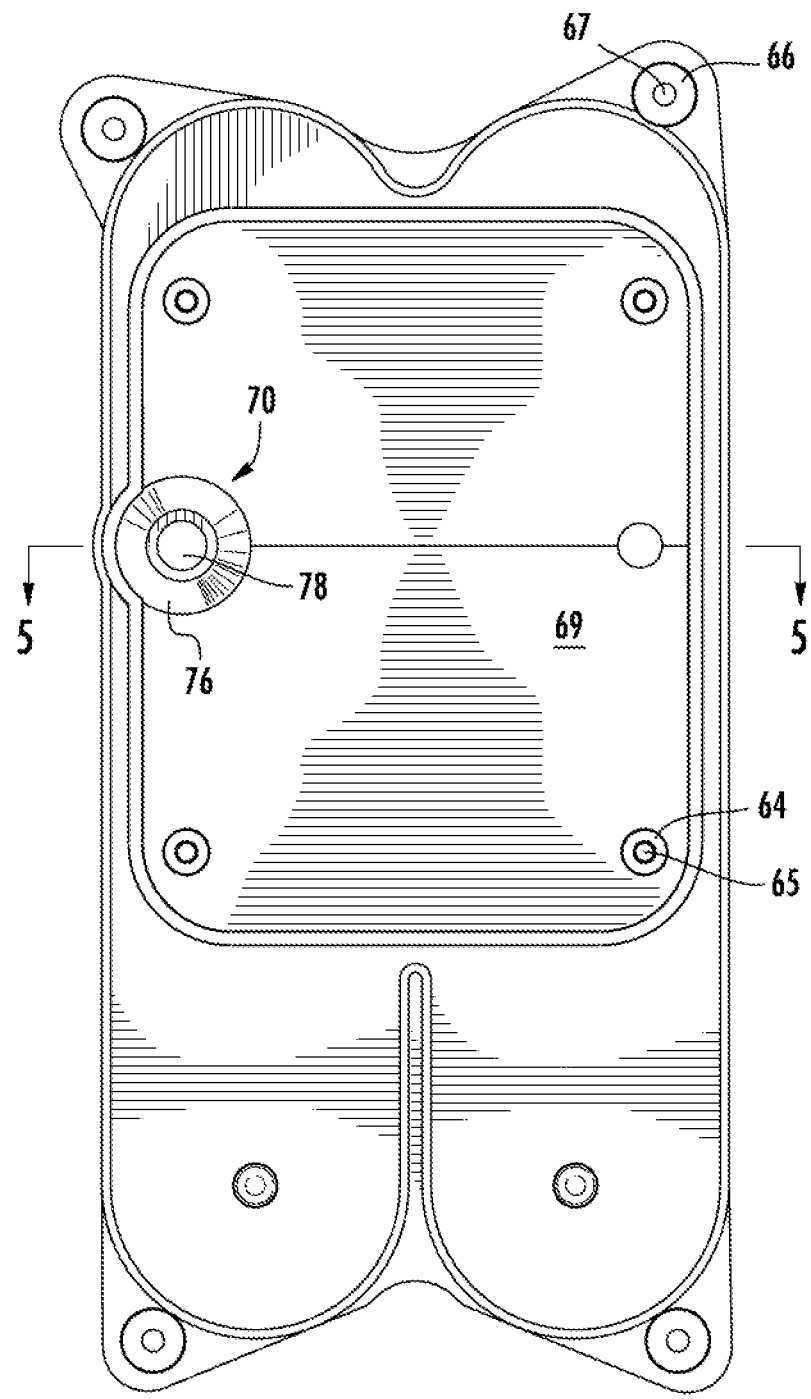
Figure 5:
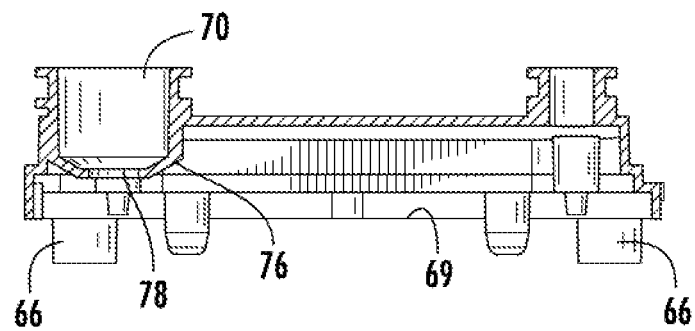
Figure 6:
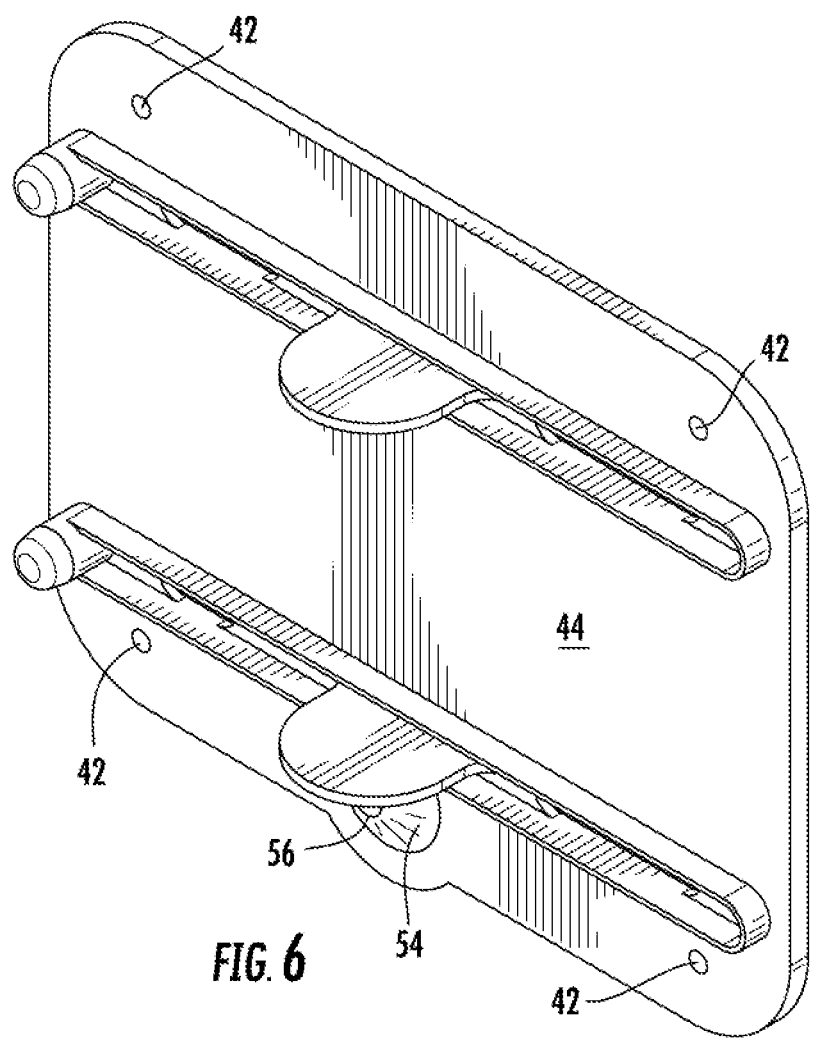
Figure 7:
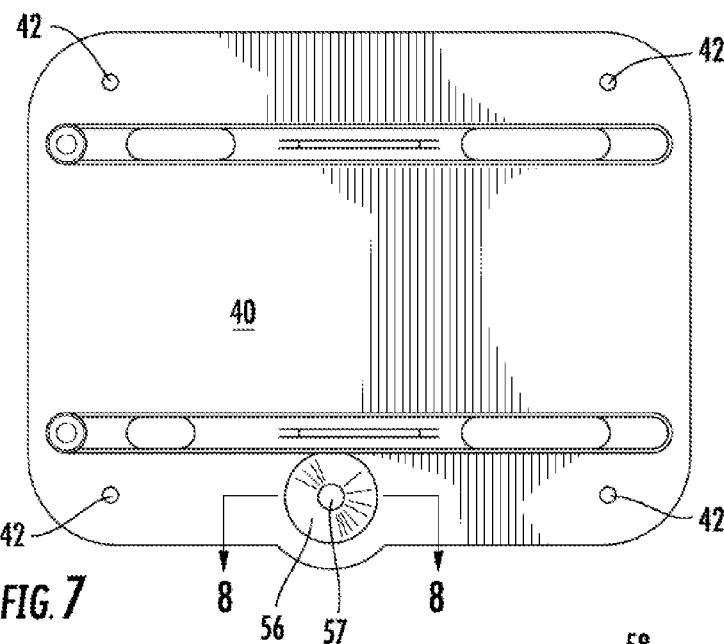
Figure 8:
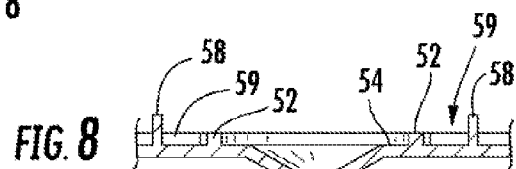
Figure 9:
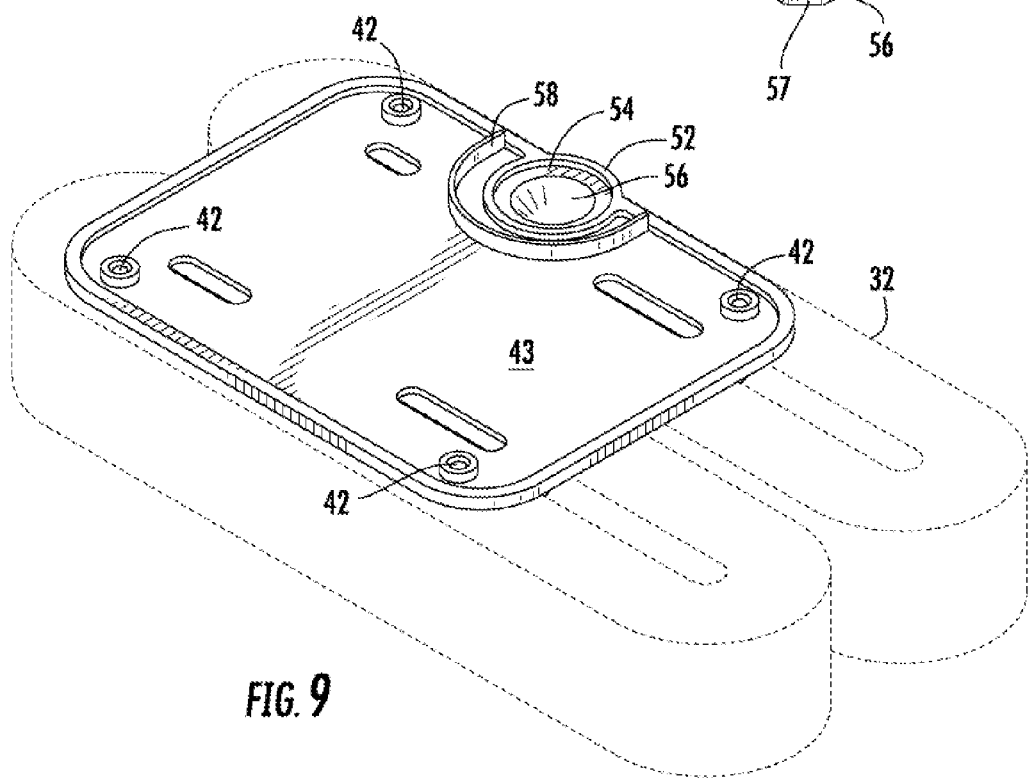
Figure 10:
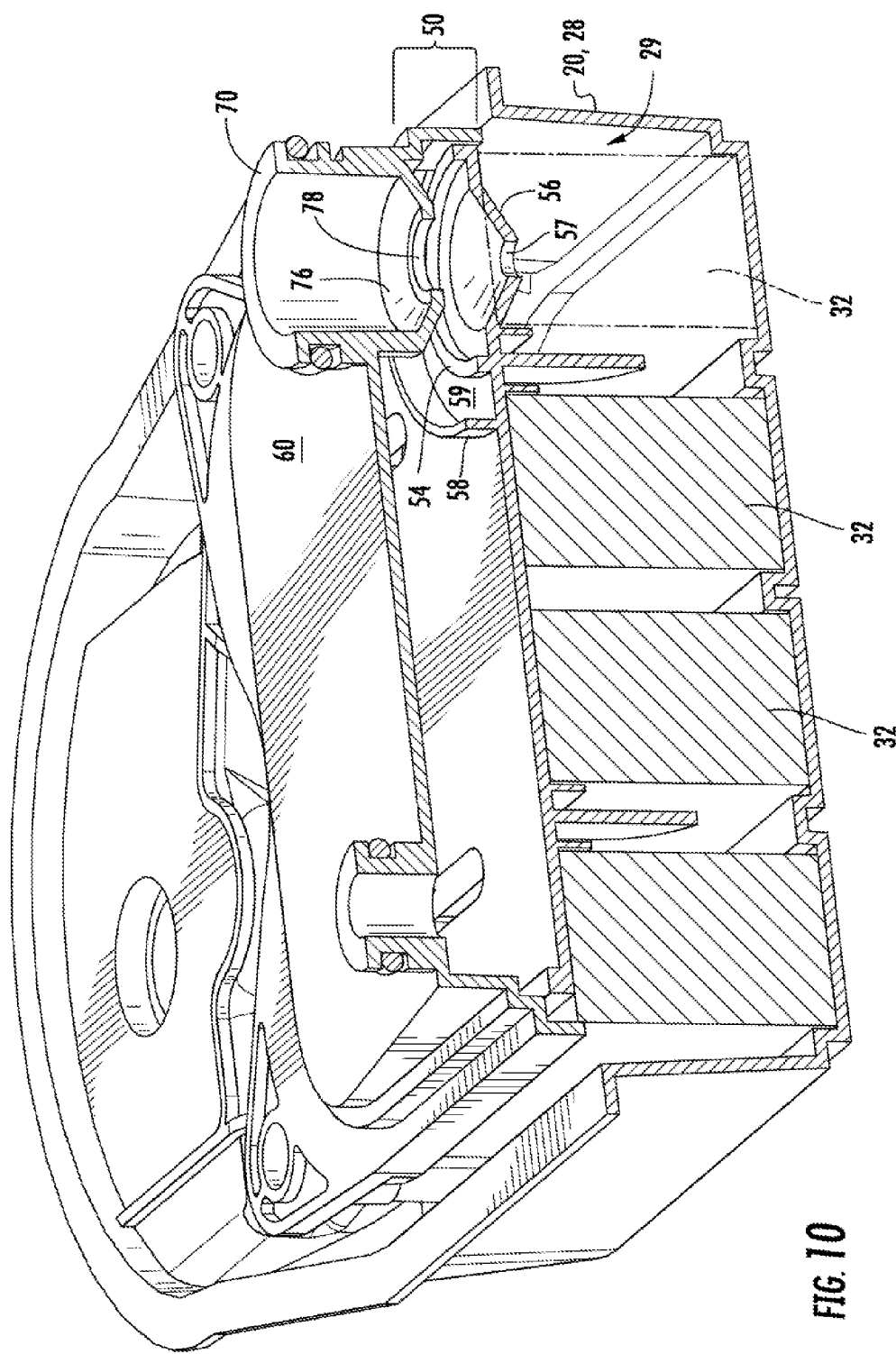

FIG. 4 bottom plan view of the removable cover;

FIG. 5 is a section view along the line 5-5 of FIG. 4;

FIG. 6 is a bottom perspective view of the baffle without a filter element;

FIG. 7 is a bottom plan view of the baffle without a filter element;

FIG. 8 is a section view along the line 8-8 of FIG. 7 that is rotated to show the orientation when assembled with a filter element;

FIG. 9 illustrates the baffle of FIGS. 6-8 as it is oriented with a known filter element; and, FIG. 10 is a section view along the line 10-10 of FIG. 1 with a portion of the filter removed for clarity.

DETAILED DESCRIPTION OF THE PREFERRED EMBODIMENT(S)

Figure 2:
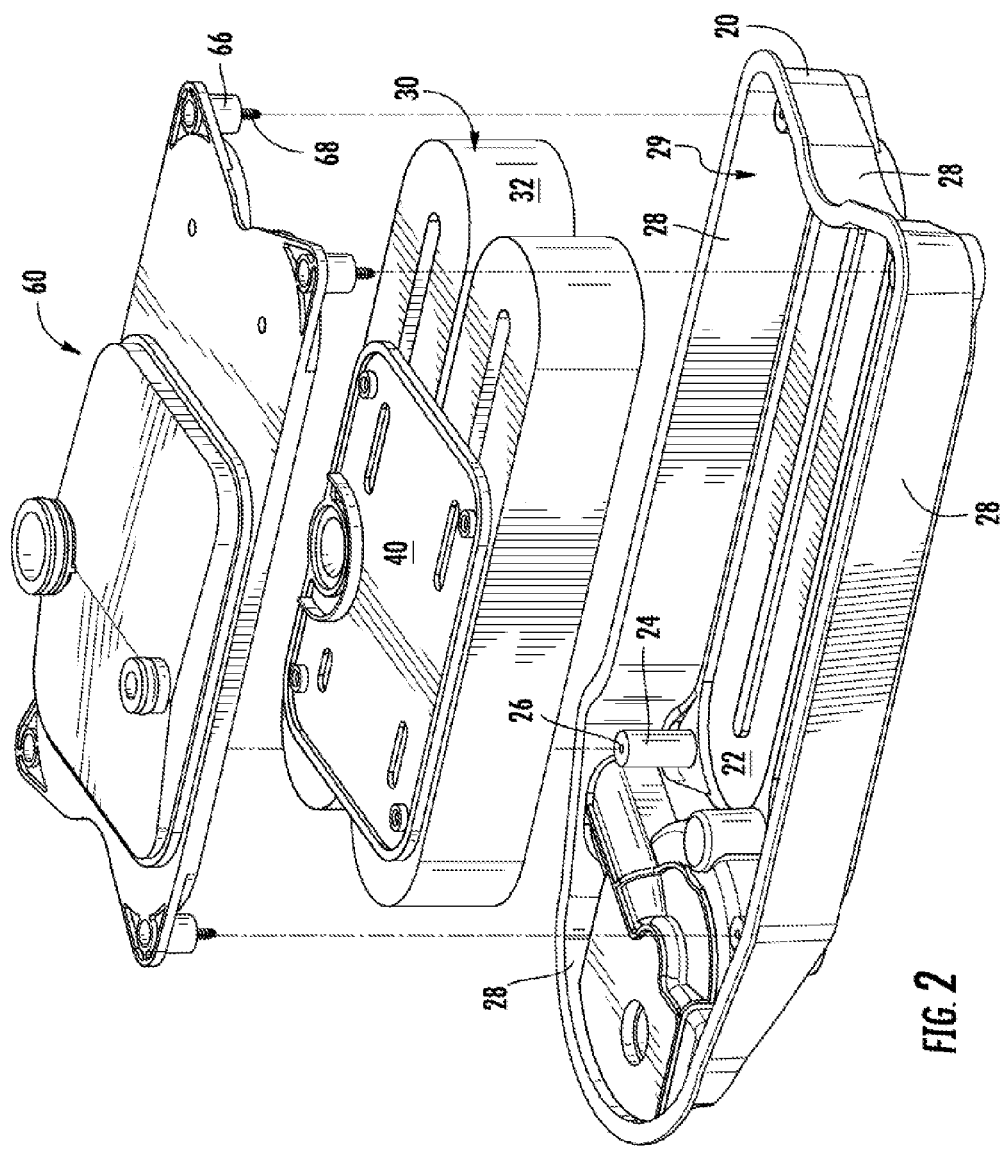
FIG. 2 is an exploded view of the assembly of FIG. 1 that illustrates the removable cover, the replaceable filter element and the associated baffle.

With reference to FIG. 1, the filter assembly 10 is dimensioned to fit in the preexisting position of a diesel engine and it essentially duplicates exterior of the existing filter with the exception of the interior features described below. The inlet tube 70 and outlet tube 14 are in the preexisting positions and use the respective preexisting connections. The base 20 of the present assembly 10 differs in that it has post 24 that mate with the corner post 66 of the cover 60 and a fastener 68 joins them together. The cover 60 has generally flat top side 62 and a raised portion 64 that supports inlet tube 70 and outlet tube 74. With reference to FIG. 2, the exploded view shows the removable cover 60, the filter assembly 30, which includes the filter 32 and baffle 40. The recess 22 in base 20 essentially duplicates the preexisting filter except for the posts 24. The base 20 has surrounding walls 28 that define a fluid reservoir 29.

Figure 3:
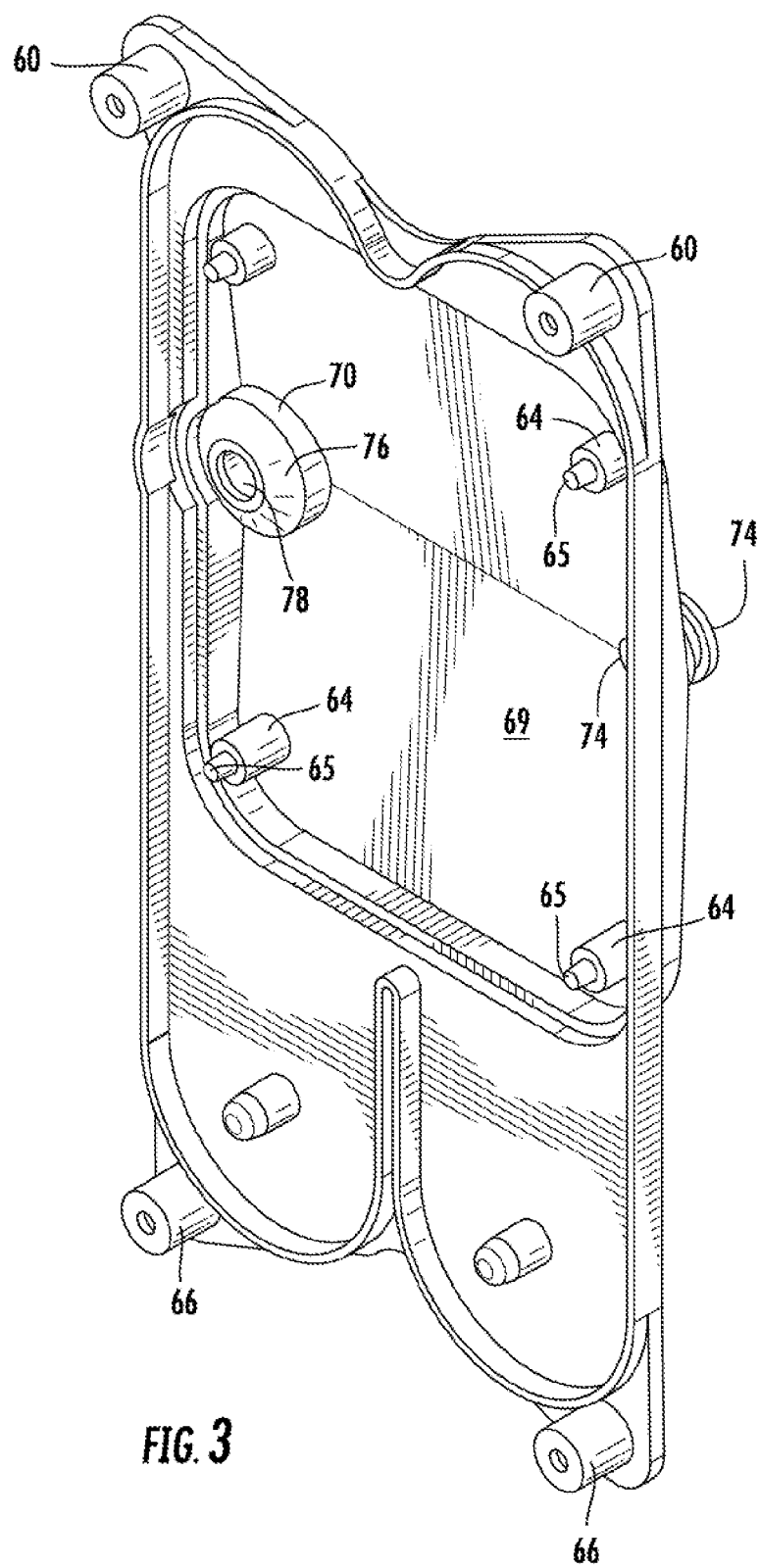
FIG. 3 is a bottom perspective view of the removable cover.

Turning to FIGS. 3 and 4, the underside of cover 20 illustrates the recess 69 formed in cover 60 by the raised portion 64. FIG. 3 also illustrates the posts 64 with pins 65 for connecting with the baffle and posts 66 for connecting to the posts 24 of the base 20. The inlet 70 tube extends beneath the raised portion 64 of cover 60 and terminates in a downwardly directed conical base 76 that defines the unrestricted central aperture 78. FIG. 5 illustrates that the only restriction applied to the terminal end of tube 70 is the conical base 76 and the central aperture 78 of base 76 is unrestricted.

FIG. 6 illustrates the underside of the baffle 40, which is configured to accept a known filter 32 that is illustrated in FIG. 2. The apertures 42 through baffle 40 receive the pins 65 when the baffle 40 is assembled to the cover 60. Currently, the preferred fit between apertures 42 and pins 65 is a releasable press fit that is sufficient to hold the parts together for assembly with the base 20; however, other forms of connections that are secure and can be separated are usable. Since the remaining elements of baffle 40 seen on the filter facing surface 44 are found in the prior art, they are not described further herein. With reference to FIGS. 7 through 10, the baffle 40 has a portion in accordance with the invention that receives the conical base 76 and together with conical base 76 forms the separator 50 illustrated in FIG. 10. The fluid impact portion of separator 50 on cover facing surface 43 of baffle 40 has an upstand ring 52 and a flat ring 54 that are adjacent to and surround the conical recess 56, and a semi-circular wall 58 that meets the outer perimeter of baffle 40 and is spaced from the other separator elements by the semi-circular ring 59. The lower end 57 of conical recess 56 is a closed, generally flat surface.

As those skilled in the art will recognize by reference to FIG. 10, the present invention operates in the same manner as the prior art in that fluid entering inlet tube is accelerated by the conical base 76. The unrestricted central aperture 78 adds to the acceleration of the fluid directed toward the conical recess 56. The space provided in separator 50, between the base 76 and the recess 56, enables gas entrapped within the fluid to separate from the fluid. At the same time, the upstand ring 52 and semi-circular wall 58 control the fluid flow, which eventually overflows the semi-circular wall 58, flows cover facing surface of baffle 40 and drains down to the filter element.

What is claimed is:

1. A filter assembly that includes a separator for separating gas from a liquid, the assembly comprising:
 a base with surrounding walls that define a fluid reservoir;
 a baffle that overlies at least a portion of the reservoir;
 a filter element that is beneath the baffle and in the reservoir; and
 a cover that is removably fastened to the base and includes a fluid inlet;
 wherein the fluid inlet terminates in a conical base with an unrestricted opening and the baffle includes a conical recess that is spaced from the conical base, the conical recess is surrounded by and extends down from a flat ring, and the flat ring is concentrically surrounded by an upstand ring.

2. A filter assembly that includes a separator for separating gas from a liquid, the assembly comprising:
- a base with surrounding walls that define a fluid reservoir;
- a baffle that overlies at least a portion of the reservoir, the baffle concentrically including a flat ring, an upstand ring, and a wall;
- a filter that is beneath the baffle and in the reservoir; and,
- a cover that is removably fastened to the base and includes a fluid inlet upstream from the filter and a fluid outlet downstream from the filter;
- wherein the cover cooperates with the flat ring, the upstand ring, and the wall to form the separator and the fluid inlet terminates in a conical base with an unrestricted opening and the baffle includes a conical recess.

* * * * *